(No Model.)
J. G. LIVINGSTON.
HAY AND GRAIN ELEVATOR.
No. 296,856. Patented Apr. 15, 1884.
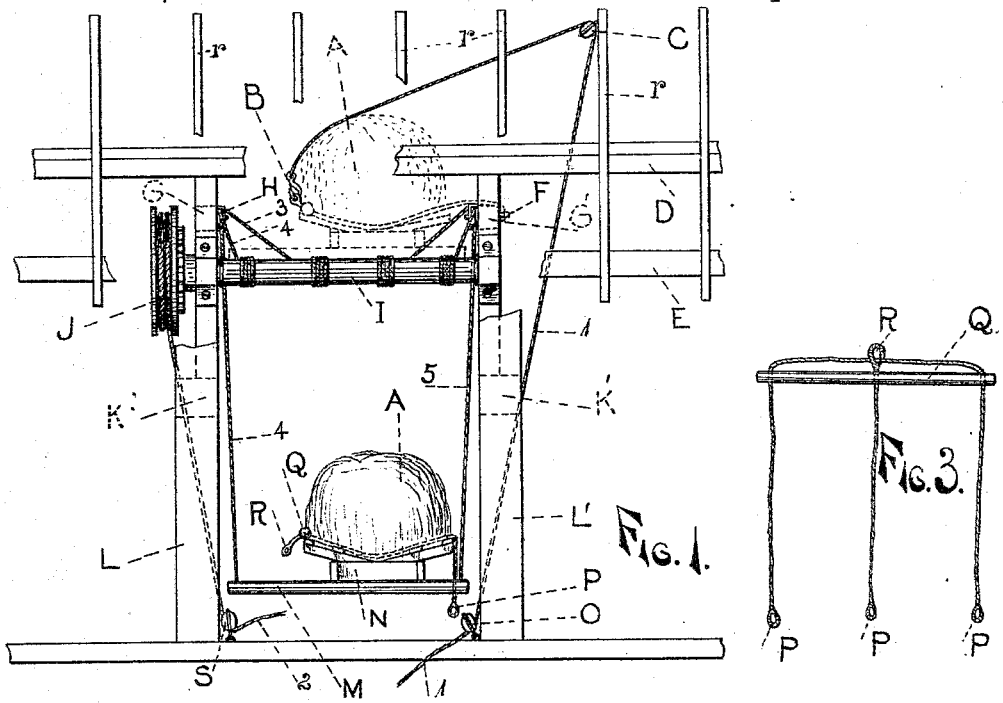
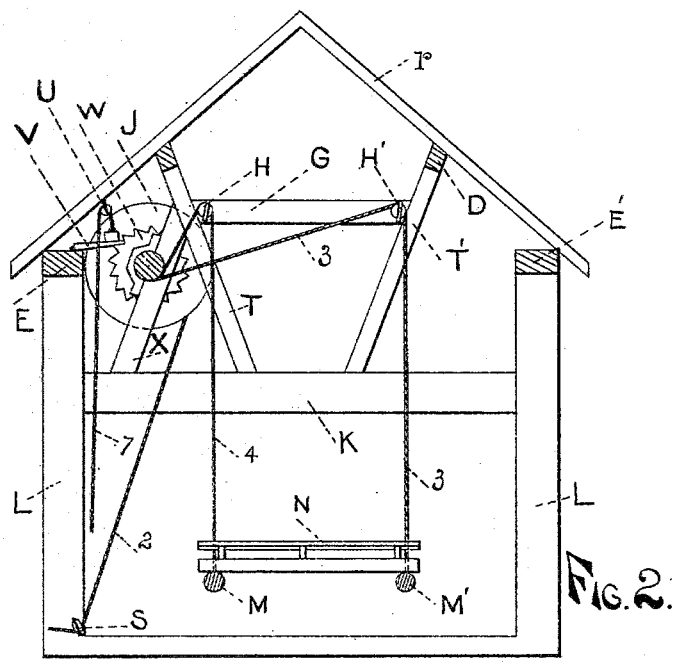
Witnesses:
Adolf R. Mason
Ella P. Shuster
Inventor
John G. Livingston
per Cyrus E. Perkins
Attorney

UNITED STATES PATENT OFFICE.

JOHN G. LIVINGSTON, OF BOWNE, ASSIGNOR OF ONE-HALF TO FREDERICK ROBBINS, OF CAMPBELL, MICHIGAN.

HAY AND GRAIN ELEVATOR.

SPECIFICATION forming part of Letters Patent No. 296,856, dated April 15, 1884.

Application filed January 16, 1884. (No model.)

*To all whom it may concern:*

Be it known that I, JOHN G. LIVINGSTON, a citizen of the United States, residing at Bowne, in the county of Kent and State of Michigan, have invented certain new and useful Improvements in Hay and Grain Elevators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a detailed view in perspective as seen through the open barn-door. Fig. 2 is a sectional end view. Fig. 3 is a view of the bail in detail.

Similar letters refer to similar parts throughout the several views.

My invention has for its object the raising of hay or grain on the rack and the dumping of the entire load in a body, as hereinafter described, thereby securing a great saving of time and of labor.

I describe my invention as follows: I construct an elevator for use in a barn by means of the roller I, running in journals fastened to braces X X, said roller being operated by the rope 2, passing over the drum-wheel J down through the pulley S, as shown in Fig. 1. To said roller I fasten the ropes 3, 4, 5, and 6. Said rope 4 passes over the pulley H, and ends in a loop, in which is inserted one end of the pole M. Said rope 3 passes over the pulley H', and is similarly fastened to one end of the pole M'. In corresponding manner the ropes 5 and 6 pass from said roller through pulleys, and are fastened to the other ends of said poles M and M'. As before stated, said poles M M' are held by loops at the ends of said ropes 3 4 5 6, and may thus be quickly removed. Said drum-wheel J has on its inner side the ratchet-wheel W, and the weighted catch V, operated by the rope 7, passing over the pulley U down to the barn-floor. (See Fig. 2.) The position of said roller I is about on the plane of the top plate, and as near the same as may be and allow room for the free movement of the drum-wheel. (See Fig. 2.) In the rack N, I place the bail shown in Fig. 3, consisting of the stick Q and the ropes P P P, having looped ends, the center rope having also the loop R. Said bail is so placed in the rack that the loop R is upon the side nearest the drum-wheel, and the loops P P P on the other. The load of hay or grain is then placed upon the rack, and the poles M M' being removed, the load is drawn into the barn. Said poles M M' are then inserted beneath the rack into the loops of the ropes 3 4 5 6, a horse attached to rope 2, and the load elevated so that the bottom of the rack N is on a level with the purlin-beams G G'. In said purlin-beam G' are fastened three pegs, F F F, and over these are slipped the loops P P P of said bail. Then the loop R is caught by the hook B, having attached thereto the rope 1, passing over the pulley C, fastened to the rafter $r$, and then down through the pulley O, where, horse or other power being applied, said load is thereby drawn over the purlin-beam G', and dumped in the mow below.

What I claim, and desire to secure by Letters Patent of the United States, is—

1. The combination, in a hay and grain elevator, of the roller I, having drum-wheel J, the ropes 3 4 5 6, the pulleys H H and H' H', the ratchet W, the catch V, and the rope 7, with the removable poles M M', as shown and described, and for the purpose set forth.

2. In a hay and grain elevator, the combination of the bail composed of the stick Q and the ropes passing through the same, having the loops P P P and R, with the rope 1, passing through the pulleys O and C, and having at its upper end the hook B, intended to catch the loop R, and the pegs F F F, to engage the said loops P P P, all substantially as described.

In testimony whereof I affix my signature in presence of two witnesses.

JOHN G. LIVINGSTON.

Witnesses:
ADOLPH B. MASON,
ELLA P. SHUSTER.